United States Patent
Gong

(10) Patent No.: US 7,165,028 B2
(45) Date of Patent: Jan. 16, 2007

(54) METHOD OF SPEECH RECOGNITION RESISTANT TO CONVOLUTIVE DISTORTION AND ADDITIVE DISTORTION

(75) Inventor: Yifan Gong, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 848 days.

(21) Appl. No.: 10/251,734

(22) Filed: Sep. 20, 2002

(65) Prior Publication Data

US 2003/0115055 A1    Jun. 19, 2003

Related U.S. Application Data

(60) Provisional application No. 60/339,327, filed on Dec. 12, 2001.

(51) Int. Cl.
*G10L 15/20* (2006.01)

(52) U.S. Cl. ........................ 704/233; 704/256
(58) Field of Classification Search ................ 704/233, 704/256
See application file for complete search history.

(56) References Cited

U.S. PATENT DOCUMENTS

| | | | | |
|---|---|---|---|---|
| 4,630,304 A | * | 12/1986 | Borth et al. .............. 381/94.3 |
| 4,905,288 A | * | 2/1990 | Gerson et al. .............. 704/245 |
| 4,918,732 A | * | 4/1990 | Gerson et al. .............. 704/233 |
| 4,959,865 A | * | 9/1990 | Stettiner et al. ............ 704/233 |
| 5,263,019 A | * | 11/1993 | Chu .......................... 370/288 |
| 5,924,065 A | * | 7/1999 | Eberman et al. ............ 704/231 |
| 5,970,446 A | * | 10/1999 | Goldberg et al. ........... 704/233 |
| 6,006,175 A | * | 12/1999 | Holzrichter ................. 704/208 |
| 6,202,047 B1 | * | 3/2001 | Ephraim et al. ......... 704/256.6 |
| 6,219,635 B1 | * | 4/2001 | Coulter et al. .............. 704/207 |
| 6,389,393 B1 | * | 5/2002 | Gong .......................... 704/244 |
| 6,418,411 B1 | * | 7/2002 | Gong ........................ 704/256.5 |
| 6,529,872 B1 | * | 3/2003 | Cerisara et al. ............. 704/250 |
| 6,658,385 B1 | * | 12/2003 | Gong et al. ................. 704/244 |
| 6,691,091 B1 | * | 2/2004 | Cerisara et al. ............. 704/255 |
| 6,868,378 B1 | * | 3/2005 | Breton ....................... 704/233 |
| 6,876,966 B1 | * | 4/2005 | Deng et al. ................. 704/233 |
| 6,934,364 B1 | * | 8/2005 | Ho .............................. 379/21 |
| 7,096,169 B1 | * | 8/2006 | Crutchfield, Jr. ............... 703/7 |
| 7,103,541 B1 | * | 9/2006 | Attias et al. ................ 704/233 |

* cited by examiner

*Primary Examiner*—Michael N. Opsasnick
(74) *Attorney, Agent, or Firm*—W. James Brady; Frederick J. Telecky, Jr.

(57) ABSTRACT

A speech recognizer operating in both ambient noise (additive distortion) and microphone changes (convolutive distortion) is provided. For each utterance to be recognized the recognizer system adapts HMM mean vectors with noise estimates calculated from pre-utterance pause and a channel estimate calculated using an Estimation Maximization algorithm from previous utterances.

20 Claims, 2 Drawing Sheets

METHOD OF SPEECH RECOGNITION RESISTANT TO CONVOLUTIVE DISTORTION AND ADDITIVE DISTORTION

This application claims priority under 35 USC § 119(e)(1) of provisional application No. 60/339,327, filed Dec. 12, 2001.

FIELD OF INVENTION

This invention relates to speech recognition and more particularly to operation in an ambient noise environment (additive distortion) and channel changes (convolutive distortion) such as microphone changes.

BACKGROUND OF INVENTION

A speech recognizer trained with office environment speech data and operating in a mobile environment may fail due at least to at least two distortion sources. A first is background noise such as from a computer fan, car engine, road noise. The second is microphone changes such as from hand-held to hands-free or from the position to the mouth. In mobile applications of speech recognition, both microphone and background noise are subject to change. Therefore, handling simultaneously the two sources of distortion is critical to performance.

The recognition failure can be reduced by retraining the recognizer's acoustic model using large amounts of training data collected under conditions as close as possible to the testing data. There are several problems associated with this approach.

Collecting a large database to train speaker-independent HMMs is very expensive.

It is not easy to determine if the collected data can cover all future noisy environments.

The recognizer has to spend large number of parameters to cover collectively the different environments.

The average of a variety of data results in flat distribution of models, which degrades the recognition of clean speech.

Cepstral Mean Normalization (CMN) removes utterance mean and is a simple and efficient way of dealing with convolutive distortion such as telephone channel distortion. This is described by B. Atal in "Effectiveness of Linear Prediction Characteristics of the Speech Wave for Automatic Speaker Identification and Verification", Journal of Acoust. Society America, 55:1304–1312,1974. Spectral subtraction (SS) reduces background noise in the feature space. Described by S. F. Boll in "Suppression of Acoustic Noise in Speech Using Spectral Subtraction", IEEE Trans. On Acoustics Speech and Signal Processing, ASSP-27(2): 113–120, April 1979. Parallel Model Combination (PMC) gives an approximation of speech models in noisy conditions from noise-free speech models and noise estimates as described by M. J. F. Gales and S. Young in "An Improved Approach to the Hidden Markov Model Decomposition of Speech and Noise", In Proceedings of IEEE International Conference on Acoustics, Speech and Signal Processing, Volume I, pages 233–236, U.S.A., April 1992. The technique is effective for speech recognition in noisy environments with a fixed microphone. These techniques do not require any training data. However, they only deal with either convolutive (channel, microphone) distortion or additive (background noise) distortion.

Joint compensation of additive noise and convolutive noise can be achieved by introduction of a channel model and a noise model. A spectral bias for additive noise and a cepstral bias for convolutive noise are described in article entitled "A General Joint Additive and Convolutive Bias Compensation Approach Applied to Noisy Lombard Speech Recognition" in IEEE Transactions on Speech and Audio Processing by M. Afify, Y. Gong and J. P. Haton, in 6(6): 524–538, November 1998. The two biases can be calculated by application of EM (estimation maximization) in both spectral and convolutive domains. The magnitude response of the distortion channel and power spectrum of the additive noise can be estimated by an EM algorithm, using a mixture model of speech in the power spectral domain. This is described in an article entitled "Frequency-Domain Maximum Likelihood Estimation for Automatic Speech Recognition in Additive and Convolutive Noises" by Y. Zhao in IEEE Transaction on Speech and Audio Processing. 8(3): 255–266, May 2000. A procedure to calculate the convolutive component, which requires rescanning of training data is presented by J. L. Gauvain et al. in an article entitled "Developments in Continuous Speech Dictation Using the ARPA NAB News Task" published in Proceedings of IEEE International Conference on Acoustics, Speech and Signal Processing, pages 73–76, Detroit, 1996. Solution of the convolutive component by steepest descent methods is reported in article of Y. Minami and S. Furui entitled "A Maximum Likelihood Procedure for a Universal Adaptation Method Based on HMM Composition" published in Proceedings of IEEE International Conference on Acoustics, Speech and Signal Processing, pages 128–132, Detroit, 1995. The method described by Y. Minami and S. Furui entitled "Adaptation Method Based on HMM Composition and EM Algorithm" in Proceedings of IEEE International Conference on Acoustics, Speech and Signal Processing, pages 327–330, Atlanta 1996 needs additional universal speech models, and re-estimation of channel distortion with the universal models when the channel changes. A technique presented by M. J. F. Gales in Technical Report TR-154, CUED/F-INFENG, entitled "PMC for Speech Recognition in Additive and Convolutive Noise" December 1993 needs two passes of the test utterance; e.g. parameter estimation followed by recognition, several transformations between cepstral and spectral domains, and a Gaussian mixture model for clean speech.

Alternatively, the nonlinear changes of both type of distortions can be approximated by linear equations, assuming that the changes are small. A Jacobian approach described by S. Sagayama et al. in an article entitled "Jacobian Adaptation of Noisy Speech Models" in Proceedings of IEEE Automatic Speech Recognition Workshop, pages 396–403, Santa Barbara, Calif., USA, December 1997, IEEE Signal Processing Society. This Jacobian approach models speech model parameter changes as the product of a Jacobian matrix and the difference in noisy conditions, and statistical linear approximation described by N. S. Kim are along this direction. The statistical linear approximation of Kim is found in IEEE Signal Processing Letters, 5(1): 8–10, January 1998 and entitled "Statistical Linear Approximation for Environment Compensation."

Finally, Maximum Likelihood Linear Regression (MLLR) transforms HMM parameters to match the distortion factors. See article of C. J. Leggetter et al entitled "Maximum Likelihood Linear Regression for Speaker Adaptation of Continuous Density HMMs", in Computer, Speech and language, 9(2):171–185,1995. MLLR does not model explicitly channel and background noise, but approximates their effect by piece-wise linearity. When given enough data, it is effective for both sources. However, it requires training data and may introduce dependence to the speaker.

In order to make speaker-independent system robust to a wide variety of noises and channel distortions, a new method is needed that handles simultaneously both noise and channel distortions.

SUMMARY OF INVENTION

In accordance with one embodiment of the present invention speaker-independent speech recognition is provided under simultaneous presence of channel distortion and changing additive distortion such as background noise by identifying one component for channel and one component for additive distortion such as noise and using these components to derive a speech model set for operating in the presence of both types of distortions.

DESCRIPTION OF PREFERRED EMBODIMENTS OF THE PRESENT INVENTION

Figure 1:
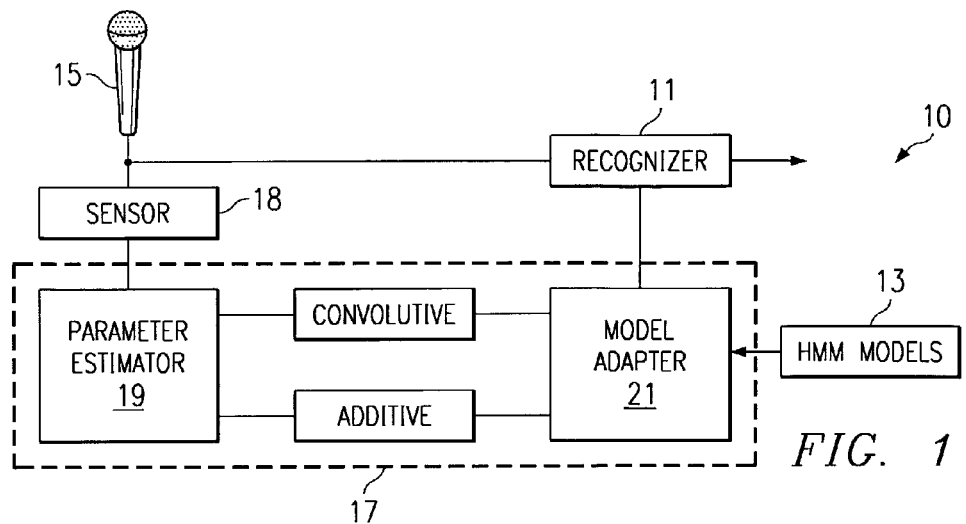
FIG. 1 illustrates a speech recognition system according to one embodiment of the present invention.
Figure 2:
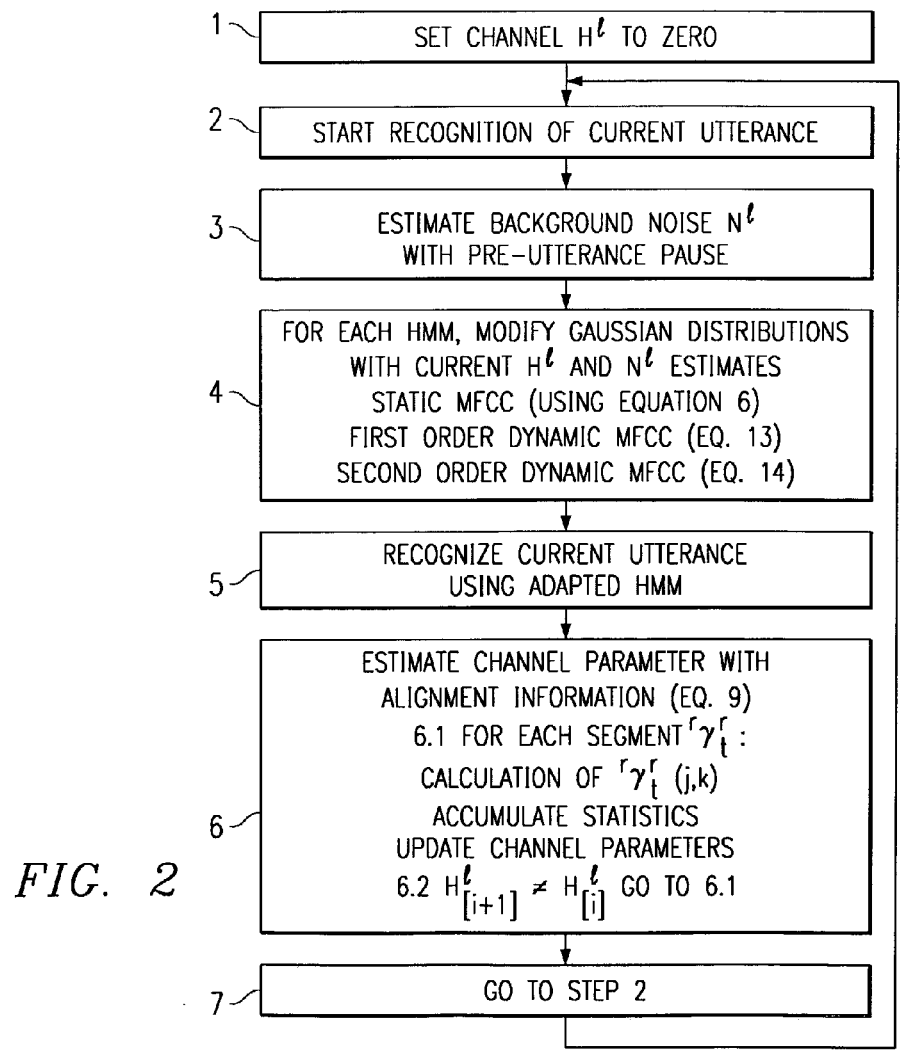
FIG. 2 is a flow chart of the operation of the processor in FIG. 1.

Before describing the joint compensation for channel and noise the influence of channel and noise is reviewed and explained. A speech signal x(n) can only be observed in a given acoustic environment. An acoustic environment can be modeled by a background noise bN(n) and a distortion channel h(n). For typical mobile speech recognition b'(n) consists of noise from office, vehicle engine and road noises, and h(n) consists of microphone type and relative position to the speaker. Let y(n) be the speech observed in the environment defined by bN(n) and h(n):

$$y(n)=(x(n)+bN(n))*h(n). \quad (1)$$

In typical speech recognition applications, bN(n) cannot be measured directly. What is available is bN(n)*h(n), which can be measured during speech pauses. Let b(n)=bN(n)*h(n), our model of distorted speech becomes:

$$y(n)=x(n)*h(n)+b(n). \quad (2)$$

Or, applying the Discrete Fourier Transform (DFT) to both sides of equation 2:

$$Y(k)=X(k)H(k)+B(k) \quad (3)$$

Representing the above quantities in logarithmic scale is the following:

$$Y^l \underline{\Delta} g(X^l, H^l, B^l) \quad (4)$$

Where $$g(X^l, H^l, B^l)(k) = \log(\exp(X^l(k)+H^l(k))+\exp(B^l(k))) \quad (5)$$

Assuming the log-normal distribution and ignoring the variance, we have $$E\{Y^l\}\underline{\Delta}\hat{m}^l = g(m^l, H^l, B^l) \quad (6)$$

Where $m^l$ is the original Gaussian mean vector, and $\hat{m}^l$ is the Gaussian mean vector compensated for the distortions caused by channel and environment noise.

Estimation of Noise Components

For estimation of the noise component, from equation 2, with x(n)=0 we have:

$$y(n)=b(n) \quad (7)$$

which means that the filtered noise b(n) can be observed during a speech pause. Given that y(n) of the window t is typically represented in MFCC (mel-scaled cepstrum coeffients) domain as $y_t$, one can calculate an estimate of noise in the log domain $B^l$ as the average of P noise frames in the log domain:

$$B^l = \frac{1}{P}\sum_{t=0}^{P} DFT(y_t) \quad (8)$$

Estimation of Channel Component

It is an object of the present invention to derive the HMMs of Y under both additive noise and convolutive distortions. The key problem is to obtain an estimate of the channel $H^l$. It is assumed that some speech data recorded in the noisy environment is available, and that the starting HMM models for X are trained on clean speech in the MFCC feature space. The speech model is continuous density Gaussian mixture HMMs. In the following, only the mean vectors of the original model space will be modified.

Let R be the number of utterances available for training a Hidden Markov Model. Let $T_r$ be the number of frames in utterance r. Let $\Omega_s$ be the set of states of an HMM. Let $\Omega_m$ be the set of mixing components of a state. The method for $H^l$ is iterative which, at iteration i+1, gives a new estimate $H^l_{[I+I]}$ of $H^l$ using:

$$H^l_{[i+1]} = H^l_{[i]} - \frac{\sum_{r=1}^{R}\sum_{t=1}^{T^r}\left[\sum_{j\in\Omega_s}\sum_{k\in\Omega_m}\gamma_t^r(j,k)g(m^l_{j,k}, H^l_{[i]}, B^l) - DFT(o_t^r)\right]}{\sum_{r=1}^{R}\sum_{t=1}^{T^r}\sum_{j\in\Omega_s}\sum_{k\in\Omega_m}\gamma_t^r(j,k)h(m^l_{j,k}, H^l_{[i]}, B^l)} \quad (9)$$

where $\gamma_t^r(j,k)$ is the joint probability of state j and mixing component k at time t of utterance r, given observed speech $o_t^r$ and current model parameters, and $$h(X^l, H^l, B^l)(k) = \frac{\eta(k)}{\eta(k)+1} \quad (10)$$

with $$\eta(k)=\exp(X^l(k)+H^l(k)-B^l(k)) \quad (11)$$

η(k) is called the generalized SNR.

As the initial condition, we set:

$$H^1_{[0]} = 0 \quad (12)$$

Compensation for Time Derivatives

Typical speech recognizers are augmented feature vectors, each of which consists of MFCC and their time derivatives. The time derivative of MFCC can be also compensated under the present framework. The compensated first order time derivative of MFCC $\dot{Y}^C$ is calculated from the original first order time derivative of MFCC $\dot{Y}^l$:

$$\dot{Y}^c = IDFT\left(\frac{\eta(k)}{\eta(k)+1}\dot{Y}^l\right) \quad (13)$$

The second order time derivative is calculated as:

$$\ddot{Y}^c = IDFT\left(\frac{\eta(k)}{\eta(k)+1}\left(\frac{1}{\eta(k)+1}(\dot{Y}^l)^2 + \ddot{Y}^l\right)\right) \quad (14)$$

Compensation Procedure

Recognizing an utterance requires an estimate of channel and noise, as in Equation 5. Typically, the channel is fixed once a microphone and transmission channel are chosen, and noise can be varying from utterance to utterance.

In accordance with the preferred embodiment of the present invention the estimate comprises the channel estimate obtained from the previously recognized utterances and the noise estimate is obtained from the pre-utterance pause of the test utterance. Referring to FIG. 1 the recognizer system 10 includes a recognizer subsystem 11, Hidden Markov Models 13, a model adapter subsystem 17, a noise sensor 18 and a microphone 15 to produce recognized speech output from the recognizer 11. The model adapter subsystem 17 includes an estimator 19 and a model adapter 21. The noise sensor 18 detects background noise during a pre-utterance pause. The estimator 19 estimates the background noise (additive parameters) and convolutive parameters. The convolutive and additive estimates are applied to the model adapter 21. The adapter 21 modifies the HMM models 13 and the adapted models are used for the speech recognition in the recognizer 11. The model adapter 21 includes a processor that operates on the sensed noise, performs the estimates and modifies the models from the HMM source 13.

As the recognizer does not have to wait for channel estimation, which would introduce at least a delay of the duration of the utterance, the recognition result is available as soon as the utterance is completed. The processor in the model adapter subsystem 17 operates according to the steps as follows:

1. Set channel $H^l$ to zero.
2. Start recognition of the current utterance.
3. Estimate background noise $N^l$ with pre-utterance pause.
4. For each HMM, modify Gaussian distributions with current $H^l$ and $N^l$ estimates
   4.1 Static MFCC (Equation 6)
   4.2 First order dynamic MFCC (Equation 13)
   4.3 Second order dynamic MFCC (Equation 14)
5. Recognize the current utterance using the adapted HMM
6. Estimate channel parameter with alignment information (Equation 9)
   6.1 For each segment r
      6.1.1 Calculation of $\gamma_t^r(j,k)$
      6.1.2 Accumulate statistics
      6.1.3 Update channel parameters
   6.2 $H^{[I+I]} \neq H^l_{[i]}$ goto 6.1
7. Go to step 2.

In step 1 the channel $H^l$ is set to zero. In step 2 the current utterance is recognized. The background noise is estimated using sensed noise during a preutterance pause in step 3. For each HMM modify Gaussian distribution with current channel $H^l$ and noise $N^l$ estimates by compensating static MFCC using $E\{Y^l\}\Delta\hat{m}^l=g(m^l, H^l, B^l)$ from equation 6 where $m^l$ is the original Gaussian mean vector and $\hat{m}$ is the Gaussian mean vector compensated for the distortions caused by channel and environment noise and compensating for time derivatives by compensating first order dynamic MFCC using $$\dot{Y}^c = IDFT\left(\frac{\eta(k)}{\eta(k)+1}\dot{Y}^l\right)$$

from equation 13 and compensating second order dynamic MFCC using $$\ddot{Y}^c = IDFT\left(\frac{\eta(k)}{\eta(k)+1}\left(\frac{1}{\eta(k)+1}(\dot{Y}^l)^2 + \ddot{Y}^l\right)\right)$$

from equation 14. The compensated first order derivative of MFCC $\dot{Y}^C$ is calculated from the original first order time derivative $\dot{Y}^l$. The next step 5 is to recognize the current utterance using the modified or adapted HMM models. In step 6 is the estimation of the channel component with alignment information using an iterative method which at iteration i+1 gives a new estimate $H^l_{[i+1]}$ of $H^l$ using:

$$H^l_{[i+1]} = H^l_{[i]} - \frac{\sum_{r=1}^{R}\sum_{t=1}^{T^r}\left[\sum_{j\in\Omega s}\sum_{k\in\Omega m}\gamma_t^r(j,k)g(m^1_{j,k}, H^1_{[i]}, B^1) - DFT(o_t^r)\right]}{\sum_{r=1}^{R}\sum_{t=1}^{T^r}\sum_{j\in\Omega s}\sum_{k\in\Omega m}\gamma_t^r(j,k)h(m^1_{j,k}, H^1_{[i]}, B^1)}$$

or equation 9.

The operations in step 6 include for each segment of utterance r, calculating $\gamma_t^r(j,k)$ accumulating statistics and update channel parameters. $\gamma_t^r(j,k)$ is the joint probability of state j and mixing component k at time t of the utterance r, given observed speech $o_t^r$ and current model parameters, and $$h(X^l, H^l, B^l)(k) = \frac{\eta(k)}{\eta(k)+1}$$

with $\eta(k)=\exp(X^l(k)+H^l(k)-B^l(k))$.

If $H^l_{[i+1]} \neq$ the final iteration of segment r $H^l_{[i]}$ then repeat the steps of the calculation, accumulate and update.

Figure 3:
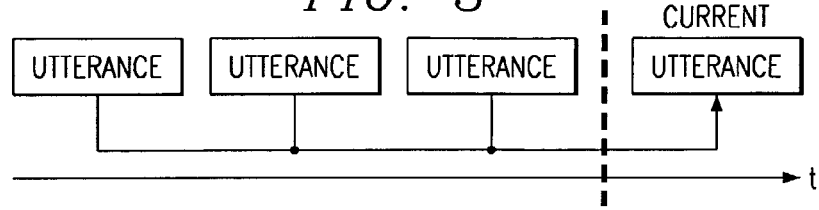
FIG. 3 illustrates past utterances used in recognizing current utterances.

In step 7 the channel estimate repeats for the next current utterance. As illustrated in FIG. 3 the estimates of the channel and noise parameters from past utterances are used for the recognition of the current utterance. The quantities allowing the determination of optimum channel estimate and obtained during the recognition of these past utterances are carried over to the current estimate.

Experiments

The database is recorded in-vehicle using an AKG M2 hands-free distant talking microphone, in three recording sessions: parked (car parked, engine off), stop and go (car driven on a stop and go basis), and highway (car driven on a highway). In each session 20 speakers (10 male) read 40 sentences each, giving 800 utterances. Each sentence is either 10, 7, or 4 digit sequence, with equal probabilities. The database is sampled at 8 kHz, with MFCC analysis and frame rate of 20 milliseconds. From the speech, MFCC of the order of 10 is derived.

HMMs used in all experiments are trained in TIDIGITS clean speech data. The HMMs contain 1957 mean vectors, and 270 diagonal variances. Evaluated on TIDIGIT test set, the recognizer gives 0.36% word error rate (WER).

Given the above HMM models, the hands-free database presents severe mismatch:

The microphone is distant talking band-limited, as compared to a high quality microphone used to collect TIDIGITS.

There is a substantial amount of background noise due to car environment, with SNR reaching 0 dB for the highway condition.

It is therefore very challenging to see the performance of different compensation approaches on this database.

To improve the performance in noisy environments, the variances of the Gaussian PDFs can be MAP adapted to some slightly noisy data, e.g. the parked-eval data. Such adaptation will not affect recognition of clean speech, but will reduce variance mismatch between HMMs and the noisy speech.

Ideally, the bias corresponding to microphone should be independent of the testing utterance. However, due to limited data for bias estimation, speaker-specificity, and background noise, the actual estimate may vary from utterance to utterance.

Figure 4:
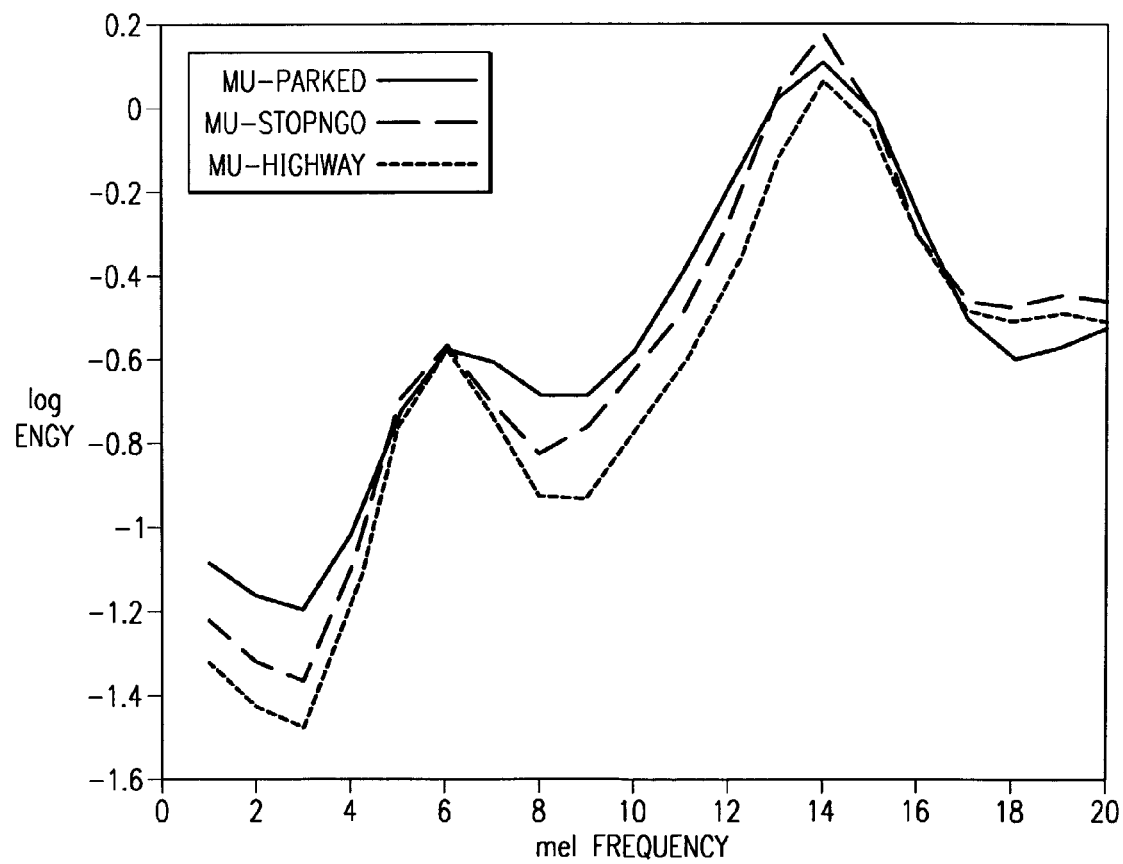
FIG. 4 plots the bias estimate averaged over all testing utterances.

FIG. 4 plots the estimated $H^I$ for the three driving conditions, averaged over each condition. We observe that:

In general the estimates from different driving conditions are in agreement, which shows that the estimation is quite independent of noise level.

The curves show some divergence at low frequencies, which can be attributed to the larger difference in energy among driving conditions.

The new algorithm is referred to as JAC (joint compensation of additive noise and convolutive distortion). Table 1 shows that:

Compared to noise-free recognition WER (0.36%), without any compensation (BASELINE) the recognition performance degrades severely.

TABLE 1 word error rate (%) as function of driving conditions and compensation methods.

|  | PARKED | CITY DRIVING | HIGHWAY |
| --- | --- | --- | --- |
| BASELINE | 1.38 | 30.3 | 73.2 |
| CMN | 0.59 | 18.8 | 51.7 |

TABLE 1-continued word error rate (%) as function of driving conditions and compensation methods.

|  | PARKED | CITY DRIVING | HIGHWAY |
| --- | --- | --- | --- |
| PMC | 1.74 | 6.29 | 17.0 |
| JAC | 0.43 | 1.26 | 5.02 |

CMN effectively reduces the WER for parked data, but is not effective for driving conditions where additive noise becomes dominant.

PMC substantially reduces the WER for driving conditions, but gives poor results for parked data where microphone mismatch is dominant.

JAC gives lower WER than non-JAC methods.

Although preferred embodiments have been described, it will be apparent to those skilled in the relevant art that various modifications, additions, substitutions, and the Ike can be made without departing from the spirit of the invention and these are therefore considered to be within the scope of the invention as defined in the following claims.

The invention claimed is:

1. A method of speech recognition comprising the steps of:
   receiving speech utterances and sensing noise during speech pauses;
   providing models for recognizing speech;
   estimating additive noise during pauses in speech to provide additive noise estimate;
   adapting the models to additive noise and convolutional channel bias to provide adapted models with adapted model states;
   comparing input speech utterances with the adapted models for recognizing the speech and providing an alignment between an input speech utterance and recognized models and
   estimating the convolutional channel bias by an iterative statistical maximum-likelihood method using said alignment and said additive noise estimate that maximizes the channel bias based on the probability likelihood of each speech data input frame feature vector of said input speech utterance mapping to the existing adapted model states to generate the maximum-likelihood channel bias estimate.

2. The method of claim 1 wherein parameters of the models are based on log spectral parameters.

3. The method of claim 1 wherein parameters of the models are mel frequency cepstral parameters.

4. The method of claim 1 wherein said estimating step includes calculating the average of the log spectral domain during speech pauses.

5. The method of claim 1 wherein said adapting step includes adapting log spectral domain model parameters to a log spectral domain noise estimate and a log spectral domain channel estimate.

6. The method of claim 1 wherein said convolutional channel bias estimate includes estimating the log spectral domain channel bias by the maximum-likelihood method using said output alignment and said additive noise estimate to generate the maximum-likelihood spectral domain channel bias estimate.

7. The method of claim 1 wherein the models include first order time derivative features and the adapting step includes adaptation of first order time derivative features.

8. The method of claim 7 wherein the first order time derivative features are first order time derivatives of log spectral domain parameters.

9. The method of claim 1 wherein the models include second order time and the adapting step includes adaptation of second order time derivative features.

10. The method of claim 9 wherein said second order time derivative features are second order time derivatives of log spectral domain parameters.

11. A speech recognizer comprising:
a microphone and /or sensor for receiving speech utterances and sensing noise during pauses;
models for recognizing speech;
an additive noise estimator for estimating additive noise during pauses in speech to provide an additive noise estimate;
a model adapter subsystem for adapting the models to additive noise and convolutional channel bias to provide adapted models with adapted model states;
a recognizer subsystem which compares input speech utterances with the adapted models for recognizing the speech and outputs an alignment between an input speech utterance and recognized models and
a convolutional channel bias estimator that estimates the convolutional channel bias by a an iterative statistical maximum-likelihood method using said alignment and said additive noise estimate that maximizes the channel bias based on the probability likelihood of each speech data input frame feature vector of said input speech utterance mapping to the existing adapted model states to generate a maximum-likelihood channel bias estimate.

12. The recognizer of claim 1 wherein parameters of the models are based on log spectral parameters.

13. The recognizer of claim 1 wherein parameters of the models are mel frequency cepstral parameters.

14. The recognizer of claim 1, wherein said convolutional channel bias estimator estimates the log spectral domain channel bias by the maximum-likelihood method using said output alignment and said additive noise estimate to generate the maximum-likelihood spectral domain channel bias estimate.

15. The recognizer of claim 1 wherein the models include first order time derivative features and the adapter includes adaptation of first order time derivative features.

16. The recognizer of claim 15 wherein the first order time derivative features are first order time derivatives of log spectral domain parameters.

17. The recognizer of claim 1 wherein the models include second order time derivative features and the adapter includes adaptation of second order time derivative features.

18. The recognizer of claim 17 wherein said second order time derivative features are second order time derivatives of log spectral domain parameters.

19. The recognizer of claim 1, wherein said noise estimate is determined by calculating the average of the log spectral domain during speech pauses.

20. The recognizer of claim 19, wherein said model adapter subsystem adapts log spectral domain model parameters to a log spectral domain noise estimate and a log spectral domain channel estimate.

* * * * *